United States Patent
Ozturk et al.

(10) Patent No.: US 10,303,459 B2
(45) Date of Patent: *May 28, 2019

(54) ELECTRONIC SYSTEM WITH UPDATE CONTROL MECHANISM AND METHOD OF OPERATION THEREOF

(71) Applicant: Samsung Electronics Co., Ltd., Suwon-si, Gyeonggi-Do (KR)

(72) Inventors: Ayberk Ozturk, Pleasanton, CA (US); Richard Deglin, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,992

(22) Filed: Oct. 26, 2017

(65) Prior Publication Data

US 2018/0046451 A1    Feb. 15, 2018

Related U.S. Application Data

(63) Continuation of application No. 15/067,887, filed on Mar. 11, 2016, now Pat. No. 9,858,067.

(Continued)

(51) Int. Cl.
*G06F 8/65* (2018.01)
*G06F 8/654* (2018.01)
*G06F 9/44* (2018.01)

(52) U.S. Cl.
CPC .............. *G06F 8/654* (2018.02); *G06F 8/65* (2013.01)

(58) Field of Classification Search
CPC ........................................................ G06F 8/65
(Continued)

(56) References Cited

U.S. PATENT DOCUMENTS 6,708,231 B1    3/2004  Kitagawa
7,293,169 B1 *  11/2007 Righi .................. G06F 8/65
                                                  713/2

(Continued)

*Primary Examiner* — Ryan D. Coyer
(74) *Attorney, Agent, or Firm* — Perspectives Law Group, Corp.

(57) ABSTRACT

An electronic system includes: an interface control unit configured to receive a write buffer command; a command core, coupled to the interface control unit, configured to execute a firmware update based on the write buffer command; a non-volatile memory array, coupled to the command core, configured to store an image of a primary file system, a secondary file system, a primary firmware, and a secondary firmware; a tightly coupled memory (TCM), coupled to the command core, configured to contain an operating firmware; and a volatile memory, coupled to the interface control unit, configured to store the write buffer command including a product image; wherein: the command core is configured to execute in order: verify the product image, extract an operating firmware executable and a solid state file system (SSFS) update from the product image, copy the operating firmware executable to the secondary firmware and the TCM, restart the operating firmware as the operating firmware executable in the TCM, extract a solid state file system (SSFS) update from the product image, copy the SSFS update to the secondary file system, copy the operating firmware executable to the primary firmware, and copy the SSFS update to the primary file system.

20 Claims, 6 Drawing Sheets

Related U.S. Application Data

(60) Provisional application No. 62/237,290, filed on Oct. 5, 2015.

(58) Field of Classification Search
USPC .......................................................... 717/170
See application file for complete search history.

(56) References Cited

U.S. PATENT DOCUMENTS

| | | |
|---|---|---|
| 7,698,698 B2 | 4/2010 | Skan |
| 8,286,156 B2 | 10/2012 | Gavens et al. |
| 2002/0194582 A1* | 12/2002 | Torii .......................... G06F 8/65 |
| | | 717/171 |
| 2003/0163508 A1* | 8/2003 | Goodman ................ G06F 8/656 |
| | | 718/100 |
| 2004/0139357 A1* | 7/2004 | Lee ............................ G06F 1/26 |
| | | 713/300 |
| 2007/0169088 A1* | 7/2007 | Lambert ............. G06F 11/0709 |
| | | 717/168 |
| 2011/0209134 A1 | 8/2011 | Toda |
| 2016/0124740 A1* | 5/2016 | Choi ........................ G06F 8/654 |
| | | 717/168 |
| 2017/0017485 A1* | 1/2017 | Ye ............................ G06F 8/656 |

* cited by examiner

ELECTRONIC SYSTEM WITH UPDATE CONTROL MECHANISM AND METHOD OF OPERATION THEREOF

CROSS REFERENCE TO RELATED APPLICATION(S)

This is a Continuation of co-pending U.S. patent application Ser. No. 15/067,887 filed Mar. 11, 2016, and the subject matter thereof is incorporated herein by reference thereto. U.S. patent application Ser. No. 15/067,887 filed Mar. 11, 2016 further claims the benefit of U.S. Provisional Patent Application Ser. No. 62/237,290 filed Oct. 5, 2015, and the subject matter thereof is incorporated herein by reference thereto.

TECHNICAL FIELD

An embodiment of the present invention relates generally to an electronic system, and more particularly to a system for data storage functions for electronic systems.

BACKGROUND

Modern electronic systems rely on rapid signal processing for improving the communication capabilities of system users. The integrated circuit development process has made great strides to provide circuits that can improve the signal processing capabilities of the electronic systems. The electronic systems can include storage devices, cellular telephones, WIFI connected computer systems, wireless remote control devices, electronic test equipment, wireless routers, or radio communication systems.

Updates to the operating firmware or software of the electronic systems have become an essential part of our everyday lives. Often electronic systems that are in the midst of being updated can lose power, causing data corruption and in some cases make the electronic system inoperative. Many devices post warnings that power must be maintained throughout the update process. An unexpected power loss can be devastating to the device.

Thus, a need still remains for electronic system with update control mechanism to improve execution reliability and performance in high stress and high reliability data centers. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: an interface control unit configured to receive a write buffer command; a command core, coupled to the interface control unit, configured to execute a firmware update based on the write buffer command; a non-volatile memory array, coupled to the command core, configured to store an image of a primary file system, a secondary file system, a primary firmware, and a secondary firmware; a tightly coupled memory (TCM), coupled to the command core, configured to contain an operating firmware; and a volatile memory, coupled to the interface control unit, configured to store the write buffer command including a product image; wherein: the command core is configured to execute in order: verify the product image, extract an operating firmware executable from the product image, copy the operating firmware executable to the secondary firmware and the TCM, restart the operating firmware as the operating firmware executable in the TCM, extract a solid state file system (SSFS) update from the product image, copy the SSFS update to the secondary file system, copy the operating firmware executable to the primary firmware, and copy the SSFS update to the primary file system.

An embodiment of the present invention provides a method of operation of an electronic system, the system including: an interface control unit configured to receive a write buffer command; a command core, coupled to the interface control unit, configured to execute a firmware update based on the write buffer command; a non-volatile memory array, coupled to the command core, configured to store an image of a primary file system, a secondary file system, a primary firmware, and a secondary firmware; a tightly coupled memory (TCM), coupled to the command core, configured to contain an operating firmware; and a volatile memory, coupled to the interface control unit, configured to store the write buffer command including a product image; the method comprising: receiving a write buffer command; and executing a firmware update based on the write buffer command including executing in order: verifying the product image in the write buffer command, extracting an operating firmware executable from the product image, copying the operating firmware executable to the secondary firmware and the TCM, restart the operating firmware as the operating firmware executable in the TCM, extracting a solid state file system (SSFS) update from the product image, copying the SSFS update to the secondary file system, copying the operating firmware executable to the primary firmware, and copying the SSFS update to the primary file system.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
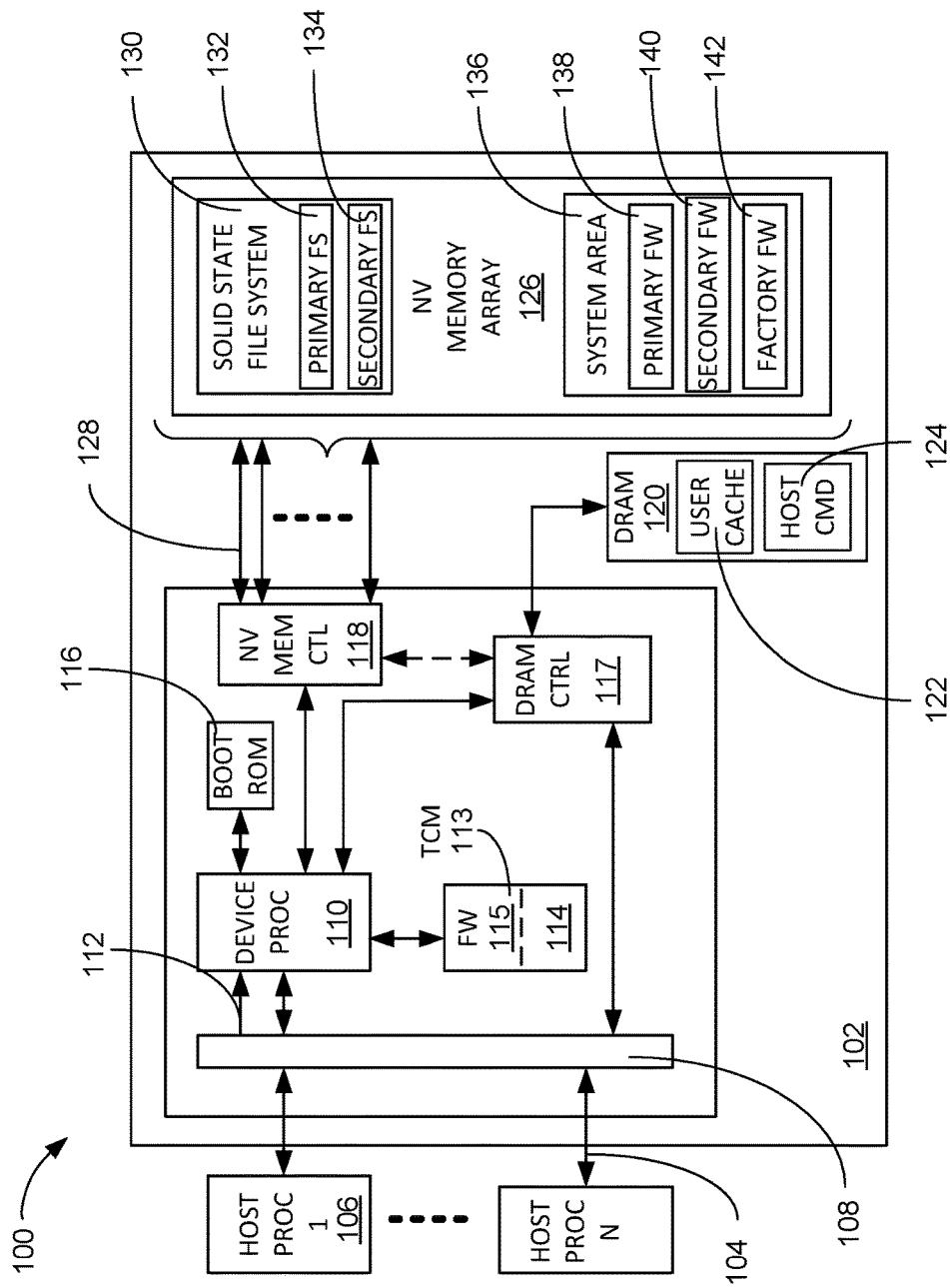
FIG. 1 is an example of an architectural block diagram of an electronic system with update control mechanism in an embodiment.

Various embodiments provide an update control mechanism for updating operating firmware that is safe from power interruptions at any time during the update process. The host processor can issue a write buffer command to update a product image, which can contain new operating firmware, a new file system, private reserved file updates, and log and mode page updates. In order to be guaranteed that a power failure cannot cause the electronic system to enter an unstable state, care must be taken to preserve the ability to boot-up and operate through the interface at all times.

Various embodiments provide an apparatus and method for updating the product image without putting the electronic system at risk. The embodiments can barricade the interface while executing the activation of the new product image in order to prevent unexpected interface time-out and selective resets to the electronic system that could cause data corruption.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The term "unit" referred to herein is a circuit formed of hardware components or hardware state machines used for specific functions. The "unit" can be for timing critical functions and does not necessarily include software functions or support.

Referring now to FIG. 1, therein is shown an example of an architectural block diagram of an electronic system 100 with an update control mechanism in an embodiment. The electronic system 100 includes a non-volatile storage device 102, examples of such devices can include solid state storage devices (SSSD) based on Flash memory, magnetic random access memory (MRAM), Resistive Random Access Memory (RRAM), and Phase Change Memory (PCM), as well as hybrid disk storage devices, and key value storage adapters, which are addressed by way of a key value for identifying file structures. The non-volatile storage device 102 can be used for data processing in a computing environment for managing large databases as well as normal fixed block transfers from the operating system.

A device coupling structure 104 can be a communication structure for passing commands, data, and status that links the non-volatile storage device 102 to a host processor 106. The device coupling structure 104 can be an input/output interface structure connected between the host processor 106 and the non-volatile storage device 102. The device coupling structure 104 can include a peripheral computer interface express (PCI-e), fiber channel (FC), small computer system interface (SCSI), or serial attached SCSI (SAS), Ethernet, and the host's memory channel interface, or the like. The device coupling structure 104 can be implemented as a memory bus for applications of the electronic system 100, such as host internal applications. The device coupling structure 104 can provide local or remote connectivity between the host processor 106 and the non-volatile storage device 102. The connection of the device coupling structure 104 between the non-volatile storage device 102 and the host processor 106 is performed in a manner that meets the specification of the specific device coupling structure 104. The host processor 106 can be a general purpose computer, a computer network, a server, a storage processor, GPU, ASIC, FPGA, PLD, or the like.

The device coupling structure 104 can be managed by an interface controller 108, which can provide protocol support for transferring the commands, data, and status between the non-volatile storage device 102 and the host processor 106. The interface controller 108 can be coupled to a device processor 110, which provides interface support including command interpretation, status generation, and command execution set-up. The device processor 110 can include multiple processor cores, each having the same or differing processing capabilities. The device processor 110 can include a single processor core, 2 processor cores, four processor cores, or another number of the processor cores. The interface controller 108 can also detect and propagate an interface reset signal that can be masked or disabled by the device processor 110. The device processor 110 can be coupled to a maskable reset 112 from the interface controller 108.

The device processor 110 can be coupled to a tightly coupled memory (TCM) 113, which can contain the operating firmware (FW) 115 for quicker access. A boot read-only-memory (ROM) 116 can provide a loading mechanism for providing the operating firmware 115 to the TCM 113. During a power-on, system reset, or selective reset, the boot ROM 116 can cause the device processor 110 to copy a working version of the operating FW 115 to the TMC 113 for normal execution. During an update of the operating FW 115, the device processor 110 can operate only a single active processor core and can terminate the operations on any additional processor cores.

A TCM reserved 114 can be an upper address portion of memory of the TCM 113 that is used during the operation of a firmware update. The device processor 110 can be forced to execute updated firmware code held in the TCM reserved 114, but upon a power failure the device processor would restart execution from the base address of the TCM 113, which revert to executing the existing down level firmware from the base address of the TCM 113.

The device processor 110 can also be coupled to a volatile memory controller 117 and a non-volatile memory array controller 118. The volatile memory controller 117 can be coupled to a volatile memory 120, such as a dynamic random access memory (DRAM) 120, which can contain a user data cache 122 and a host command queue 124. The host command queue 124 can have a fixed starting address in the volatile memory 120.

The non-volatile (NV) memory array controller 118 can be coupled to a non-volatile (NV) memory array 126 by NV memory channels 128. The number of the NV memory channels 128 can be based on the size of the NV memory array 126 and the performance goals of the non-volatile storage device 102.

The NV memory array 126 can be based on any non-volatile storage media, including flash memory, magnetic random access memory (MRAM), Resistive Random Access Memory (RRAM), or Phase Change Memory (PCM), amongst others. The NV memory array 126 can have a solid state file system area 130, which can include a primary file system 132, and a secondary file system 134. The NV memory array 126 can also have a system area 136, which can hold a primary firmware 138, a secondary firmware location 140, and a factory firmware 142.

The operation of the non-volatile storage device 102 can be modified by an update of the operating FW 115. When the host processor 106 sends a write buffer command through the physical interface 104, the interface controller 108 causes the volatile memory controller 117 to store the command at a specific address in the host command queue 124. The interface controller 108 can verify the correctness of the write buffer command by performing a cyclical redundancy check (CRC) on-the-fly compare with the CRC contained in the command. The device processor 110 can perform additional checks to verify a product image held within the command prior to its execution.

The update of the operating FW 115 should be executed in a way that guarantees the product image will be implemented correctly even through the risk of power failures. Embodiments of this invention can perform the update without risk of data loss or data corruption even with the occurrence of a power failure.

It has been discovered that the non-volatile storage device 102 can receive a write buffer command from the host processor 106 for updating the operating FW 115. The parsing of the write buffer command can be done in a way that will assure success of the update of the operating FW 115 without concern of power-loss during the update process.

Figure 2:
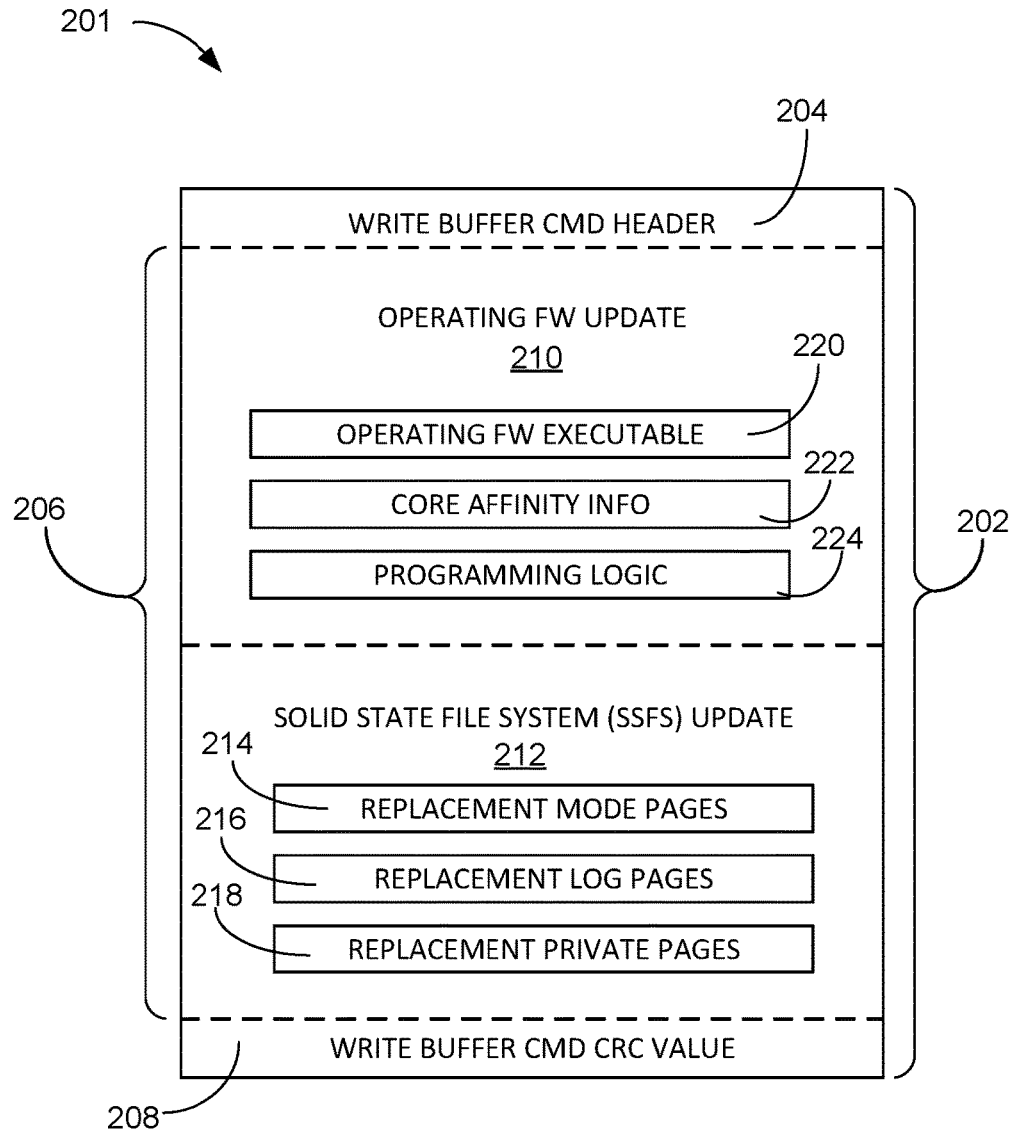
FIG. 2 is an example of an architectural block diagram of a payload of a write buffer command in an embodiment.

Referring now to FIG. 2, therein is shown an example of an architectural block diagram of a payload of a write buffer command 201 in an embodiment. The architectural block diagram of the write buffer command 201 depicts a payload 202 including a write buffer command header 204, which can indicate the write buffer command is for a firmware update, a product image 206, and a write buffer command CRC value 208.

While downloading the payload 202, the interface controller 108 of FIG. 1 can calculate a running circular redundancy check (CRC) for the transfer. The write buffer command CRC value 208 can be calculated to provide a zero resultant CRC, providing an on-the-fly verification for the entire transfer. Any error in the transmission will be discovered by a non-zero residual CRC at the end of the transfer.

The product image 206 can include an operating firmware (FW) update 210 and a solid state file system (SSFS) update 212. Both the operating FW update 210 and the SSFS update 212 can include a verification key linked to the write buffer command header 204 and can be used to verify the product image 206.

The SSFS update 212 can include replacement mode pages 214, replacement log pages 216, and replacement private pages 218. Each of which can be linked to the SSFS update 212 by their verification key related to the write buffer command header 204.

The operating FW update 210 can include an operating FW update 220, a core affinity information block 222, and a programming logic 224. Each of which can be linked to the operating FW update 210 by their verification key related to the write buffer command header 204. By relating the component parts of the operating FW update 210 and the SSFS update 212, the device processor 110 of FIG. 1 can verify their correctness in the product image 206 once they are installed in the NV memory array 126 of FIG. 1.

It has been discovered that the write buffer command 201 can provide a transfer verification on-the-fly, as well as a compatibility signature within the operating FW executable 220 and the SSFS update 212. The inclusion of the programming logic 224 as part of the operating FW update 210, can deliver the firmware update strategy along with the operating FW executable 220 that is to be updated.

Figure 3:
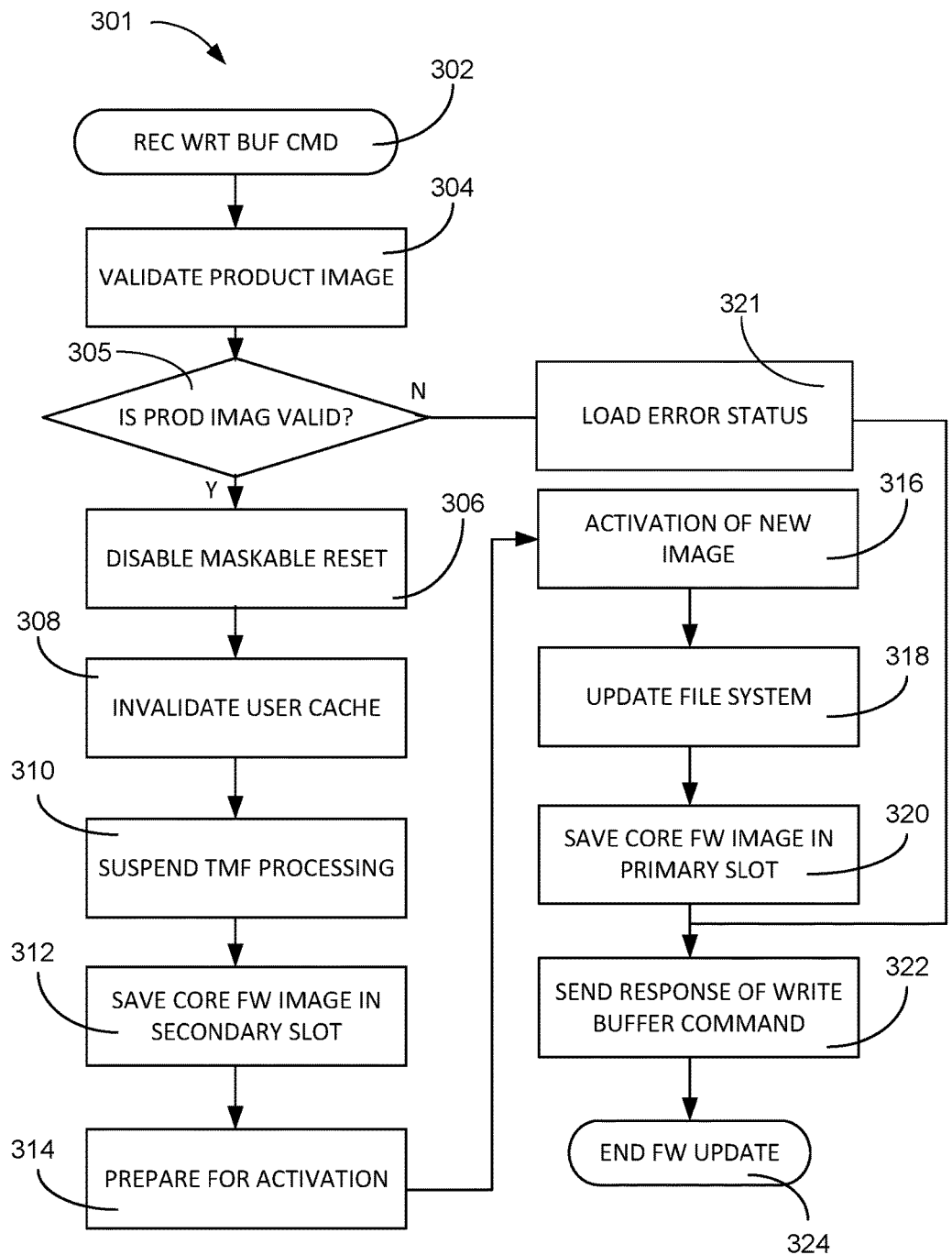
FIG. 3 is an example of a flow chart of a firmware update of a non-volatile storage device in an embodiment.

Referring now to FIG. 3, therein is shown an example of a flow chart of a firmware update 301 of a non-volatile storage device 102 in an embodiment. The flow chart of the firmware update 301 depicts a process by which the host processor 106 of FIG. 1 can transfer a write buffer command to the non-volatile storage device 102 of FIG. 1 in order to update the operating FW 115 of FIG. 1 of the device processor 110 of FIG. 1.

The flow chart of the firmware update 301 starts with a receive write buffer command block 302. The host processor 106 can deliver the product image 206 of FIG. 2 in the payload 202 of FIG. 2 of the write buffer command 201 of FIG. 2. The interface controller 108 of FIG. 1 can load the incoming write buffer command directly into the host command queue 124 of FIG. 1 at a predetermined starting address in the volatile memory 120 of FIG. 1. The interface controller 108 can perform an on-the-fly check of the CRC for the write buffer command as it is transferred to the host command queue 124.

The flow chart can proceed to a validate product image block 304, in which the operating FW 115 of FIG. 1 can cause the device processor 110 to evaluate the product image 206 held in the host command queue 124. The flow then proceeds to a check image valid block 305. If the validation is not successful, the flow proceeds to a load error status block 321 where the device processor 110 can load an error status indicating the product image 206, from the write buffer command, was invalid. The flow can then proceed to a send response of write buffer command block 322 to terminate the write buffer command 201 with an error status provided to the interface controller 108.

If however the validation of the product image 206 is successful, the device processor 110 can designate one of its core processors, which can take over as a command core 110 to execute the remainder of the firmware update 301.

The flow chart proceeds to a disable maskable reset block 306, in which the command core 110 can configure the interface controller 108 to block any occurrence of the interface detected reset. By disabling the maskable reset 112 of FIG. 1, the command core 110 can prevent any selective reset targeting one of the other processor cores of the device processor 110 from disrupting the firmware update 301.

The flow chart proceeds to an invalidate user cache block 308, in which the command core 110 can force the flush of any "dirty" data (data that has not been previously saved to the NV memory array 126 of FIG. 1). The dirty data held in the user cache 122 of FIG. 1 is then written to the NV memory array 126 and the user cache 122 is marked as empty.

The flow chart proceeds to a suspend task manager function processing block 310, which can now suspend the operation of the remaining processor cores in order to prevent an unexpected abort command during the remainder of the firmware update 310. Since the device processor 110 can be a multi-core processor and all of the multi-cores would access the same operating FW 115, only one of the processor cores is designated as the command core 110 for the duration of the firmware update 301.

The flow chart proceeds to a save core FW image in secondary slot block 312. The save core FW image in secondary slot block 312 causes the command core 110 to copy an operating FW executable 220 of FIG. 2 to the secondary firmware location 140 of FIG. 1 in the system area 136 of FIG. 1 in the NV memory array 126. The operating FW executable 220 is copied to the secondary firmware location 140 because a power failure would cause the device processor to boot from the primary FW 138 of FIG. 1, which would remain intact because it has not been disturbed or corrupted. Optionally, a corrupted version of the secondary firmware location 140 can be overwritten by the image of the operating FW executable 220.

The flow chart proceeds to a prepare for activation block 314, which causes the command core 110 to save all of the command threads that will need to be dispatched after the firmware update 301 is complete. The command threads can be for pending commands that were being executed by the multiple processor cores of the device processor 110 before the firmware update 301 was initiated. The multiple processor cores of the device processor 110 that are not the command core 110 are now held in a reset or frozen state.

The flow chart proceeds to an activation of new image block 316. The activation of new image block 316 causes the command core 110 to copy the operating FW executable 220 into the TCM 113 and the programming logic 224 into the TCM reserved 114. The command core 110 can start executing the programming logic 224 in the TCM reserved 114. If a power failure were to occur at this point, the boot ROM 116 of FIG. 1 would force a reload of the operating FW 115 from the primary FW 138 in the system area 136 of the NV memory array 126 without any problems.

The flow chart proceeds to an update file system block 318. The command core 110 can be executing the programming logic 224 in the TCM reserved 114 in order to copy the current file system as reflected in the primary FS 132 of FIG. 1 into the secondary FS 134 of FIG. 1. This is done to insure that the secondary FS 134 is up-to-date. The command core 110 can then copy the SSFS update 212 into the secondary FS 134. In this configuration, both the primary FS 132 and the primary FW 138 reflect the operating FW 115, but the secondary FS 134 and the secondary FW location 140 reflect the new product image 206. A power failure at this point would cause the boot rom to load the operating FW 115 and proceed as normal.

The flow chart proceeds to a save core FW in primary slot block 320. The command core 110 can now copy the operating FW executable 220 from the product image 206 into the primary FW 138 in order to replace the operating FW 115 with the new FW. If a power failure to occur at this point, the boot ROM 116 would load the updated FW into the TCM 113. If an error is detected in the updated firmware, the boot ROM 116 would then access the secondary FS 134 for the compatible copy of the SSFS. The recovery from the exception encountered by the boot ROM 116 would be to copy the secondary FS 134 into the primary FS 132. If no power failure does occur, the programming logic 224 executing in the TCM reserved 114 would copy the secondary FS 134 into the primary FS 132. To complete the exchange of the operating FW 115 for the operating FW executable 220 from the product image 206.

The flow chart proceeds to the send response of write buffer command block 322. The command core 110 can condition the interface controller 108 to respond to the host processor 106 indicating the success of the firmware update 301.

The flow chart proceeds to an end FW update block 324. The command core 110 can release the multiple cores of the device processor 110 and they can each pick-up the command threads that were pending at the start of the firmware update 301 with each of the processor cores operating with the operating FW executable 220 from the product image 206.

It has been discovered that an embodiment of the non-volatile storage device 102 can provide an apparatus and method of performing the firmware update 301 without the risk of data loss or corruption due to power failure. The boot ROM 116 can verify the compatibility of the operating FW 115 by performing a CRC check. The operating FW executable 220 can verify the primary FS 132 by comparing the verification key in both, which can match the write buffer command header 204 of FIG. 2 that installed them.

Figure 4:
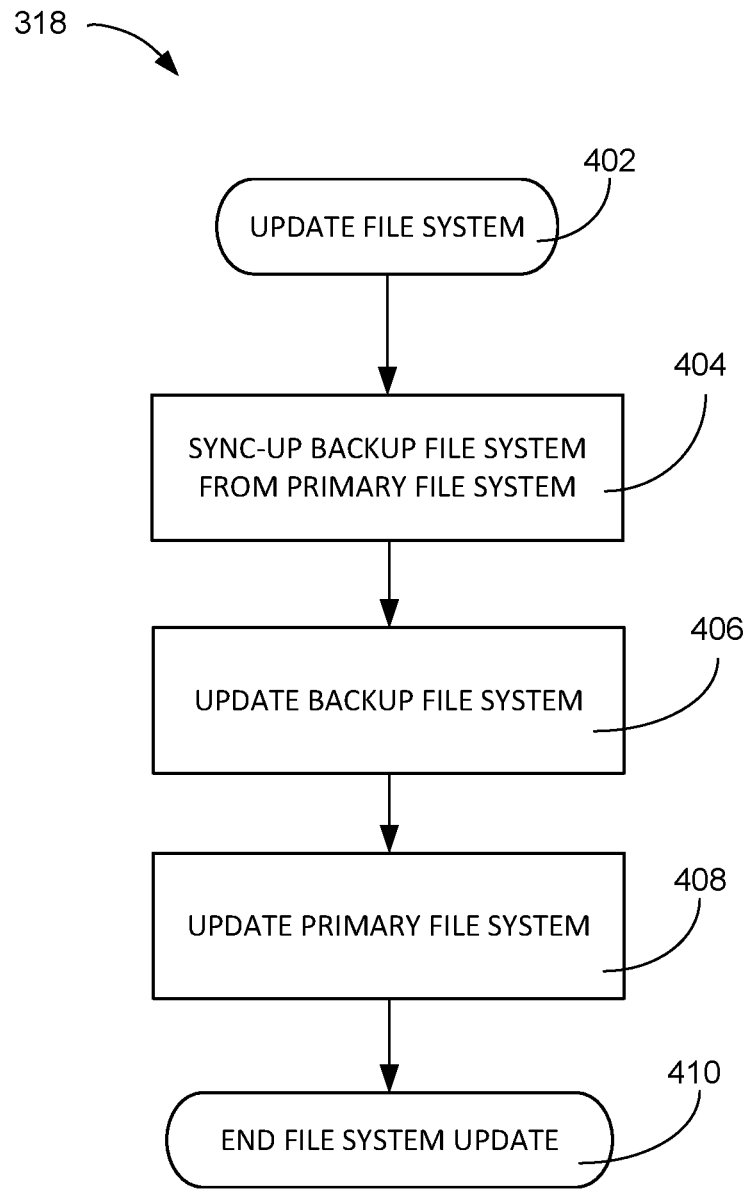
FIG. 4 is an example of a flow chart of a Solid State File System (SSFS) update in an embodiment of the present invention.

Referring now to FIG. 4, therein is shown an example of a flow chart of a Solid State File System (SSFS) update 318 in an embodiment of the present invention. The flow chart of the SSFS update 318 depicts an update file system block 402, which is in preparation of the transfer of the replacement mode pages 214 of FIG. 2, the replacement log pages 216 of FIG. 2, and the replacement private pages 218 of FIG. 2 from the product image 206 of FIG. 2.

The flow chart proceeds to a sync-up backup file system from primary file system block 404. The command core 110 has loaded the operating FW executable 220 of FIG. 2 from the operating FW update 210 of FIG. 2 into the secondary FW location 140 of FIG. 1. At this point if a power loss did occur, the device processor 110 would boot with the existing version of the operating FW 115 and its matching primary FS 132. The command core 110 can update the secondary FS 134 by copying the primary FS 132 into it. This is done to make sure the secondary FS 134 is up to date.

The flow chart proceeds to an update backup file system block 406, in which the secondary FS 134 is loaded with the SSFS update 212 of FIG. 2 from the product image 206. This now provides that both the backup FW in the secondary FW location 140 and the backup file system in the secondary FS 134 are the same updated level. At this point if a power loss did occur, the device processor 110 would still boot with the existing version of the operating FW 115 and its matching primary FS 132 because both of the primary locations contain the old versions.

The flow chart proceeds to an update primary file system block 408. The command core 110 can update the primary FW 138 with the operating FW executable 220 that will now match the secondary FW location 140. If a power failure were to occur, a subsequent check of the primary FS 132 would not match the current level of the primary FW 138, so the primary FS 132 would be repaired by copying the secondary FS 134 into the primary FS 132. The result would be that both the primary FW 138 and the primary FS 132 now both contain the updated code from the product image 206 and the device processor 110 would boot normally on the newly updated product image 206.

The command core 110 can complete the update primary file system block 408 without a power failure by copying the SSFS update 212 from the product image 206 to the primary FS 132. Once the primary FS 132 and the primary FW 138 are both at the correct level provided by the firmware update 301 of FIG. 3, the device processor 110 will only be able to boot the new FW and new FS that was delivered in the product image 206 of the write buffer command 201 of FIG. 2.

The flow chart proceeds to an end file system update 410. The non-volatile storage device 102 of FIG. 1 is now able to operate on the operating FW executable 220 and the SSFS update 212 defined by the write buffer command 201. The process of the firmware update 301 was provided by the programming logic 224 of FIG. 2 executing on the command core 110 from the TCM reserved 114.

It has been discovered that the loading of the secondary FW location 140 and the secondary FS 134 at the same updated level before attempting to update the primary FW 138 and the primary FS 132 can barricade the non-volatile storage device 102 from the possibility of data loss or corruption due to unexpected power failure.

Figure 5:
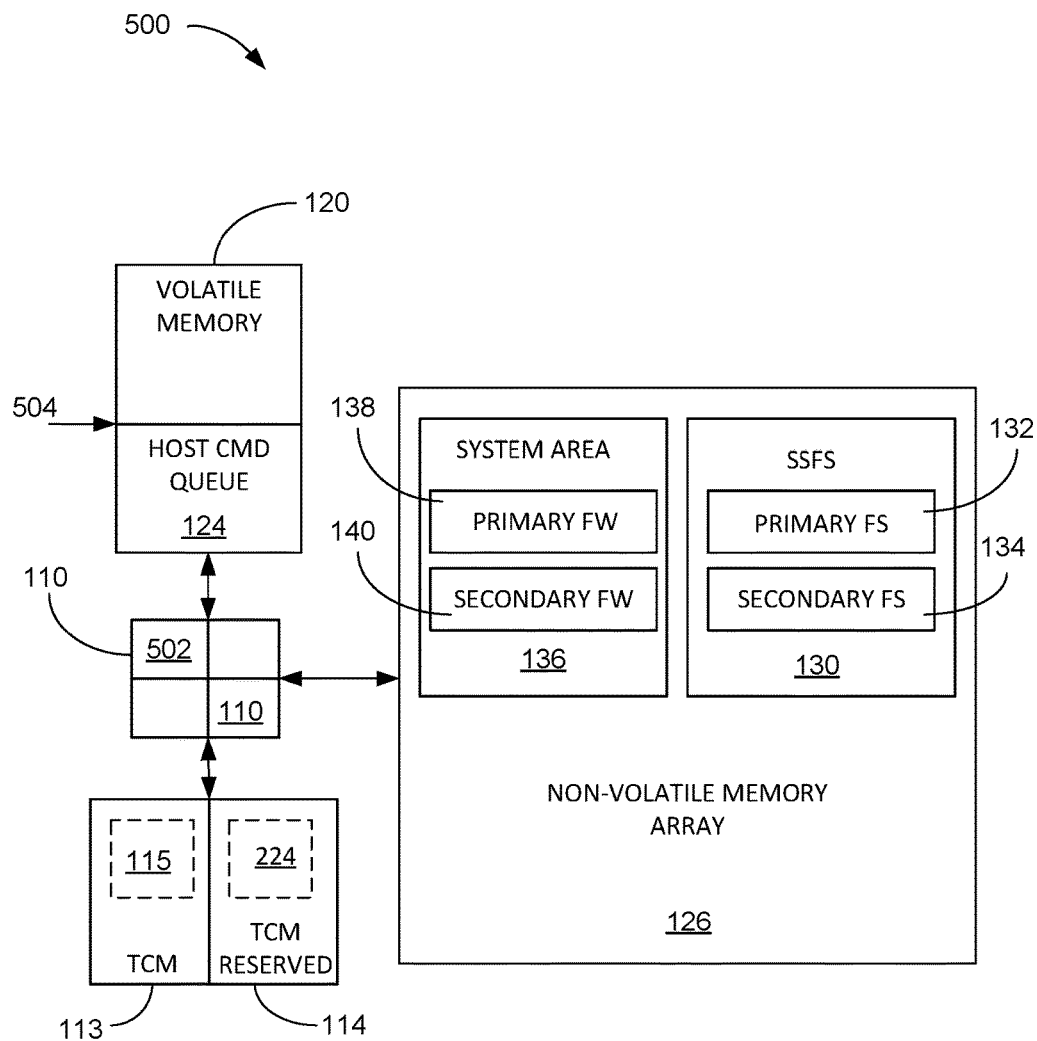
FIG. 5 is an example of a functional block diagram of a non-volatile storage system performing a firmware update in an embodiment.

Referring now to FIG. 5, therein is shown an example of a functional block diagram of a non-volatile storage system 501 performing the firmware update 301 in an embodiment. The functional block diagram of the non-volatile storage system 501 depicts a device processor 110 including multiple processor cores 502 and one of the processor cores 502 is designated as the command core 110. During the firmware update 301, the command core 110 can hold the remaining of the processor cores 502 in an idle or reset state. The command core 110 assumes all of the resources of the device processor 110.

The TCM 113 can contain the operating firmware 115, which can now be called the "old firmware". The TCM reserved 114 can contain the programming logic 224 that was extracted from the operating firmware update 210 of FIG. 2 contained in the product image 206 of FIG. 2. The write buffer command that contains the product image 206 can be loaded at a specific starting address 504 in the volatile memory 120.

The programming logic 224 can be accessed by the command core 110 in order to load the primary firmware 138, the secondary firmware location 140, the primary file system 132, and the secondary file system 134 in a way that can prevent the non-volatile storage system 501 from being susceptible to data loss or corruption due to unexpected power failure. The programming logic 224 can cause the command core 110 to copy the operating firmware executable 220 into the operating FW 115, but the execution remains with the programming logic 224 until the system area 136 and the SSFS 130 have been updated.

The programming logic 224 can cause the command core 110 to load, in a fixed order, the secondary firmware location 140 with the operating firmware executable 220, representing the new firmware from the product image 206, the secondary file system 134 with the SSFS update 212 of FIG. 2, representing the new file system compatible with the new firmware, the primary firmware 138 with the operating firmware executable 220, and finally the primary file system 132 with the SSFS update 212.

It has been discovered that the specific order to updating provided by the programming logic 224 can protect the non-volatile storage system 501 from unexpected power failure which could interrupt the firmware update 301. At any point during the firmware update 301 the non-volatile storage system 501 will remain in a bootable and operable condition without regard to an unexpected power failure.

It is understood that the device processor 110 is shown to have four of the processor cores 502, but this is an example only and any number of the processor cores can be implemented. The fixed address 504 is required in order to allow the programming logic 224 to correctly identify the location of the operating firmware executable 220 and the SSFS update 212.

Figure 6:
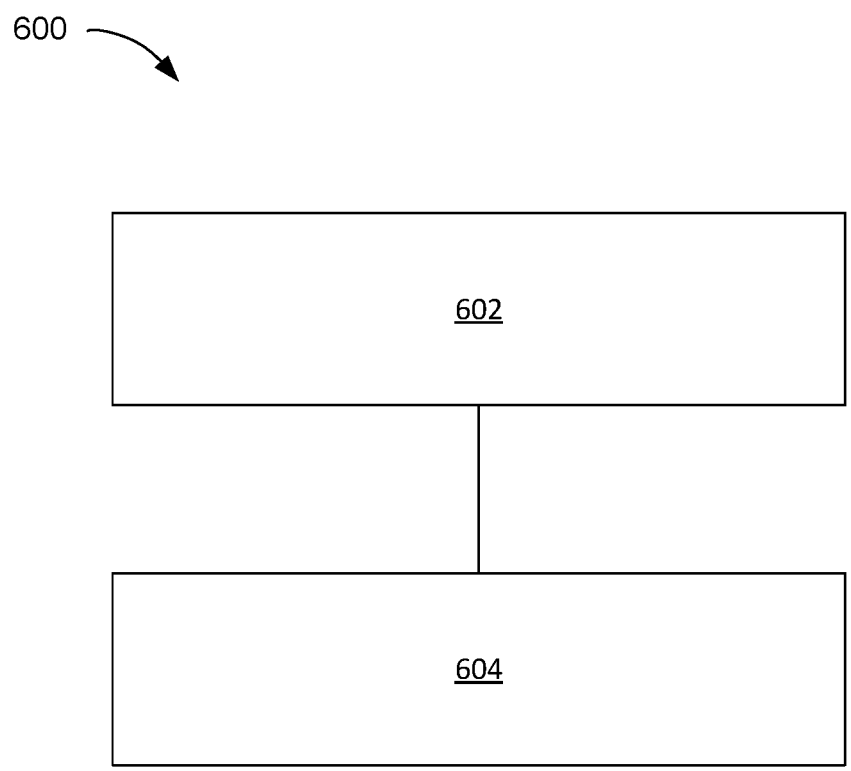
FIG. 6 is a flow chart of a method of operation of an electronic system in a further embodiment of the present invention.

Referring now to FIG. 6, therein is shown a flow chart of a method 600 of operation of an electronic system 100 in a further embodiment of the present invention. The method 600 includes: receiving receive a write buffer command in a block 602; and executing a firmware update based on the write buffer command including executing in order: verifying the product image in the write buffer command, extracting an operating firmware executable from the product image, copying the operating firmware executable to the secondary firmware and the TCM, restarting the operating firmware as the operating firmware executable in the TCM, extracting a solid state file system (SSFS) update from the product image, copying the SSFS update to the secondary file system, copying the operating firmware executable to the primary firmware, and copying the SSFS update to the primary file system in a block 604.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A electronic system comprising:
   an interface control unit configured to receive a write buffer command;
   a command core, coupled to the interface control unit, configured to execute a firmware update based on the write buffer command;
   a non-volatile memory array, coupled to the command core, configured to store an image of a primary file system, a secondary file system, a primary firmware, and a secondary firmware;
   a tightly coupled memory (TCM), coupled to the command core, configured to contain an operating firmware; and
   a volatile memory, coupled to the interface control unit, configured to store the write buffer command including a product image;
   wherein:
   the command core is configured to execute in order:
   verify the product image, extract an operating firmware executable from the product image,
copy the operating firmware executable to the secondary firmware and the TCM,
restart the operating firmware with the operating firmware executable in the TCM,
extract a solid state file system (SSFS) update from the product image,
copy the SSFS update to the secondary file system,
copy the operating firmware executable to the primary firmware, and
copy the SSFS update to the primary file system.

2. The system as claimed in claim 1 wherein the command core is a portion of a device processor configured to control the firmware update.

3. The system as claimed in claim 1 further comprising a boot read only memory (ROM), coupled to the command core, configured to:
copy the primary firmware to the TCM;
verify the primary file system is compatible with the primary firmware; and
repair the primary file system, by copying the secondary file system to the primary file system, when the primary firmware is incompatible.

4. The system as claimed in claim 1 wherein the interface control unit includes a maskable reset coupled to and disabled by the command core.

5. The system as claimed in claim 1 further comprising a TCM reserved, coupled to the command core, loaded with a programming logic from the product image.

6. The system as claimed in claim 1 wherein the non-volatile memory array is configured to include a system area, containing the primary firmware and the secondary firmware, and a solid state file system, containing the primary file system and the secondary file system.

7. The system as claimed in claim 1 wherein the volatile memory configured to store the write buffer command includes the write buffer command starting at a fixed address of a host command queue.

8. The system as claimed in claim 1 wherein the command core is one of multiple processor cores, in a device processor, configured to idle the remaining of the multiple processor cores during the firmware update.

9. The system as claimed in claim 1 wherein the interface controller is configured to verify the write buffer command by performing an on-the-fly circular redundancy check (CRC) including the write buffer command CRC value.

10. The system as claimed in claim 1 wherein the command core can be any of the multiple processor cores in a device processor.

11. A method of operation of an electronic system comprising:
an interface control unit configured to receive a write buffer command;
a command core, coupled to the interface control unit, configured to execute a firmware update based on the write buffer command;
a non-volatile memory array, coupled to the command core, configured to store an image of a primary file system, a secondary file system, a primary firmware, and a secondary firmware;
a tightly coupled memory (TCM), coupled to the command core, configured to contain an operating firmware; and
a volatile memory, coupled to the interface control unit, configured to store the write buffer command including a product image;
the method comprising:
receiving a write buffer command; and
executing a firmware update based on the write buffer command including executing in order:
verifying the product image in the write buffer command,
extracting an operating firmware executable from the product image,
copying the operating firmware executable to the secondary firmware and the TCM,
restarting the operating firmware as the operating firmware executable in the TCM,
extracting a solid state file system (SSFS) update from the product image,
copying the SSFS update to the secondary file system,
copying the operating firmware executable to the primary firmware, and
copying the SSFS update to the primary file system.

12. The method as claimed in claim 11 wherein executing the firmware update includes selecting the command core as a portion of a device processor.

13. The method as claimed in claim 11 further comprising:
copying the primary firmware to the TCM;
verifying the primary file system is compatible with the primary firmware; and
repairing the primary file system, by copying the secondary file system to the primary file system, when the primary firmware is incompatible.

14. The method as claimed in claim 11 further comprising disabling a maskable reset coupled to the command core.

15. The method as claimed in claim 11 further comprising loading a TCM reserved with a programming logic from the product image.

16. The method as claimed in claim 11 further comprising configuring the non-volatile memory array to include a system area, containing the primary firmware and the secondary firmware, and a solid state file system, containing the primary file system and the secondary file system.

17. The method as claimed in claim 11 further comprising configuring the volatile memory to store the write buffer command includes starting the write buffer command at a fixed address of a host command queue.

18. The method as claimed in claim 11 further comprising idling, by the command core, the remaining of the multiple processor cores during the firmware update.

19. The method as claimed in claim 11 further comprising verifying the write buffer command by performing an on-the-fly circular redundancy check (CRC) including the write buffer command CRC value.

20. The method as claimed in claim 11 further comprising selecting the command core by the first available of the multiple processor cores in a device processor.

* * * * *